Warren & Wilson.

Steam Generator.

No. 3,766. Reissued Dec. 14, 1869.

Witnesses:
James S. Greves
J. B. Peyton

Inventor:
A. J. Warren &
D. W. Wilson
Chipman Hosmer & Co
attys

N. PETERS, PHOTO-LITHOGRAPHER, WASHINGTON, D. C.

United States Patent Office.

A. J. WARREN AND D. W. WILSON, OF WEST EAU CLAIRE, WISCONSIN, ASSIGNORS TO THEMSELVES AND NOAH SHAW, OF SAME PLACE, AND URIAH M. STONE, OF AUGUSTA, WISCONSIN.

*Letters Patent No.* 91,800, *dated June* 22, 1869; *reissue No.* 3,766, *dated December* 14, 1869.

IMPROVEMENT IN STEAM-GENERATOR FURNACES.

The Schedule referred to in these Letters Patent and making part of the same

*To all whom it may concern:*

Be it known that we, A. J. WARREN and D. W. WILSON, of West Eau Claire, in the county of Eau Claire, and State of Wisconsin, have invented a new and valuable Improvement in the Process for Consuming Sawdust and other Fuel in Furnaces; and we do hereby declare that the following is a full, clear, and exact description of the construction and operation of the same, reference being had to the annexed drawings, making a part of this specification, and to the letters and figures of reference marked thereon.

Figure 1, of the drawings, is a top sectional view of our device.

Our invention has for its object to burn sawdust or other fuel in a furnace; and consists in the construction and arrangement of the parts hereinafter more fully described.

In the accompanying drawings—

A represents an ordinary steam-boiler, having a dome, *d*, on its top.

Under the boiler is the usual fire-box B.

Upon the front part of the boiler, and above the same, are inclined spouts E E, which lead on either side of the boiler, down toward the fire-box.

Placed at the extremities, or in any other place within said pipes, are automatically-acting valves *y y*. These valves are so constructed that they always close themselves by their own weight, or, in other words, are closed when fuel is not passing upon them, from the inclines E E.

C represents a steam-pipe, which leads from the dome *d* to the front of the boiler, and from thence passes, in a winding manner, through the flues in the boiler, and back to the front thereof, from whence it is inserted, so as to project over the fire-box.

This pipe is provided with a stop-cock, *r*, to cut off the flow of steam.

We do not wish to confine ourselves to the particular manner or position in which the pipe C runs, after leaving the dome and ending over the fire-box. The object of said pipe is to superheat the steam after it is taken from the dome *d*, and this may be done without confining it to position or course indicated.

The operation of our invention is substantially as follows:

Fire is made in the fire-box and steam generated in the boiler. Sawdust, or other fuel, is then passed down the inclined spouts E E, which is partially heated on its transit, and on its passage opens the valves *y*. After passing said valves, it is scattered, and falls upon the fire. The end of the pipe C, leading into the fire-box, is open, and jets superheated steam upon the falling sawdust or other fuel, and effectually scatters it over the grate.

Figure 4:
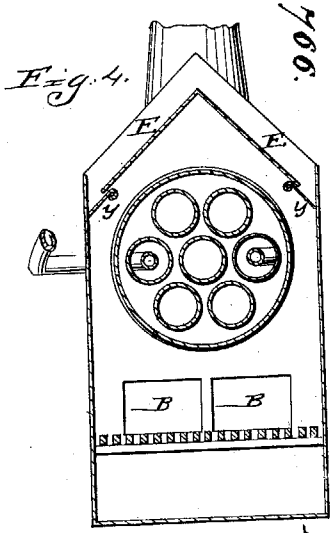
Figures 3 and 4 are front view and sectional end view thereof.
Figure 3:
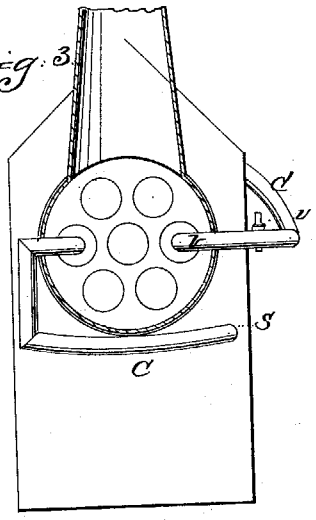
Figure 2:
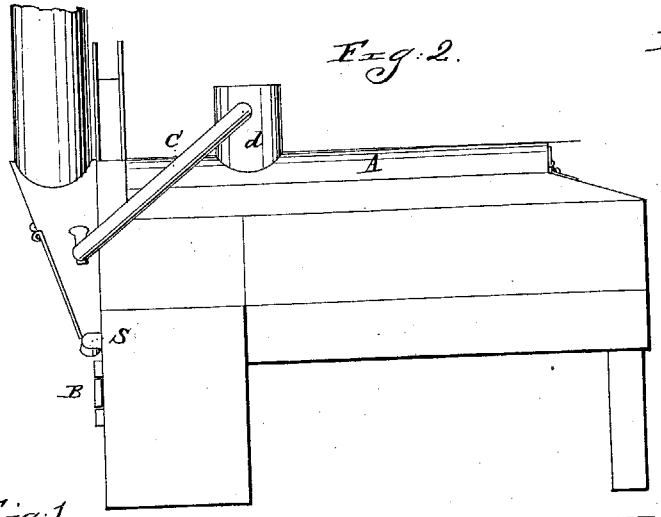
Figure 2 is a side view of the same.
Figure 1:
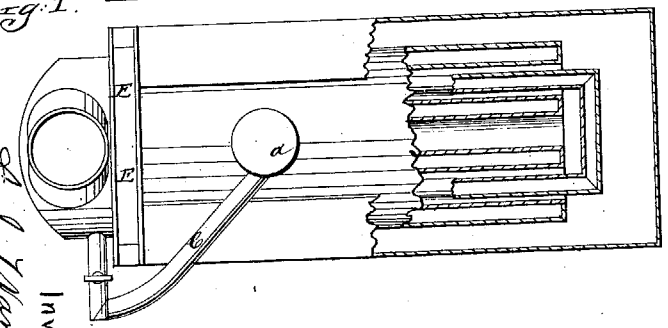

In the use of two inclined spouts, as shown in fig. 4, they answer for one or three boilers placed in a row.

If four boilers are used, two inclined spouts are used, with a central spout, the two outer inclines feed the first and fourth boilers, while the central pipe feeds the inner sides of the two central boilers.

By means of the valves *y y*, acting by the flow of sawdust, or other fuel, no gas, smoke, or flame can ascend, when the sawdust or other fuel is not being fed down.

Having thus fully described our invention,

What we claim as new, is—

1. The arrangement, upon the forward end of the boiler, of one or more inclined spouts, E E, which spouts are provided with self-acting valves, *y*, whereby the sawdust may be fed down from over the top of the boiler to the fire-box, and the valves close themselves to prevent the ascension of flame or other products of combustion, as set forth.

2. The combination of the boiler A, dome *d*, superheating-pipe C, inclined spouts E, and valves *y*, all substantially as set forth.

In testimony that we claim the above, we have hereunto subscribed our names, in the presence of two witnesses.

A. J. WARREN.
D. W. WILSON.

Witnesses:

ALEXANDER MEGGETT.
JOHN F. STONE.